US005704051A

United States Patent [19]
Lane et al.

[11] Patent Number: 5,704,051
[45] Date of Patent: Dec. 30, 1997

[54] HIERARCHICAL MENU BAR SYSTEM WITH DYNAMIC GRAPHICS AND TEXT WINDOWS

[76] Inventors: Ronald S. Lane; Miriam Weiss Lane, both of 3 Eagle View Ct., Monsey, N.Y. 10952

[21] Appl. No.: 613,527

[22] Filed: Mar. 11, 1996

Related U.S. Application Data

[63] Continuation of Ser. No. 155,464, Nov. 19, 1993, abandoned.

[51] Int. Cl.[6] ............................................. G06F 3/00
[52] U.S. Cl. ................................ 395/357; 395/353
[58] Field of Search ............................. 395/326–358, 395/806–807; 345/146, 123–125, 902, 117–120

[56] References Cited

U.S. PATENT DOCUMENTS

| | | | |
|---|---|---|---|
| 4,648,062 | 3/1987 | Johnson et al. | 395/334 |
| 4,710,763 | 1/1987 | Franke et al. | 395/353 |
| 4,712,191 | 12/1987 | Penna | 395/353 |
| 5,122,972 | 6/1992 | Richards et al. | 395/353 X |
| 5,295,242 | 3/1994 | Mashruwala et al. | 395/353 |

OTHER PUBLICATIONS

WordPerfect for Windows, WordPerfect Corp., May 1993, screen pp. 1–2.

Mossberg, "Parental Guilt Sells Encyclopedias on CD-ROM, Too", Wall Street Journal, Apr. 29, 1993, p. B1 (W).

*Primary Examiner*—John E. Breene

[57] ABSTRACT

A data processor for managing a multilevel application wherein the data processor includes a display controller that creates a three-level menu window and a data window. The menu window includes at least two levels that each incorporate select commands associated with discrete subjects wherein menu commands are concurrently displayed on screen to provide historical access information. Menu commands are converted into display presentations where each level defines a greater degree of information detail on a given subject. The data display window for these presentations is further divided into windows for text and graphics.

The foregoing arrangement has been found to be exceptionally effective at providing educational or tutorial information access in a efficient manner.

2 Claims, 3 Drawing Sheets

HIERARCHICAL MENU BAR SYSTEM WITH DYNAMIC GRAPHICS AND TEXT WINDOWS

This application is a continuation of Ser. No. 08/155,464, filed Nov. 19, 1993, now abandoned.

The present invention relates generally to data processing systems enhanced by dynamic information access and, more particularly, a data process methodology that provides a dynamic multilayer menuing system for layered access to complex information in a user friendly manner.

BACKGROUND OF THE INVENTION

Computer systems may differ in many ways, but most have a few select components that are common among the systems. For example, most computers have data storage, via magnetic memory, data input through a keyboard and/or position transducer (mouse), and finally data output via screen display (CRT, LCD or other). The present invention is primarily concerned with the display system, and, in particular, the manner in which the two-dimensional display provides information about seeking data in systems that have multiple levels of detail.

Information that is visually displayed by a computer is formatted into a matrix, wherein the matrix defines the two-dimensional mapping of color pixels on a display screen. The arrangement and orientation of these individually activated pixels provides larger visual structures representative of the underlying data of interest. The visual structures can be based on graphics and/or text. In either case, the system includes program controlled subroutines that properly organizes the visual structures into the graphics and/or text that convey information to the user in a meaningful way.

Of course, no computer system can provide all the data about multiple levels of information to the user in one screen display. Therefore, there has developed within the software community a variety of distinct menuing systems that gives the user a plethora of paths to specific information. The differing systems range in complexity, with many employing sequential screens where different choices are displayed contingent on selections made from previous screen menus.

For example, in text-based systems, menus are presented on the display giving the user a list of selections, e.g., "file"; "edit"; etc. The user selects one, wherein the original menu is removed and replaced with a second menu giving a subset of new options to the user, e.g., "save" or "delete". Usually, the new menu replaces the old one, thereby removing the lineage of the menu selection. In a graphical interface, such as a windows environment, many menus are presented together; but when the operation is selected, each menu disappears—removing menu path lineage information.

For simple applications involving few choices, the lack of lineage information is mostly unimportant. But for many sophisticated applications, there is a need for a menuing system that provides a lineage of the path taken to access the presently displayed data. This is particularly important for applications designed for operation by the less computer literate.

Moreover, the initial menus in a multi-tier menu system are provided as merely a portal for deeper probing into the application choices. Conventionally, there was no link between available data and the initial menu entry. Only when the most detailed and lowest echelon of the menu selections is reached will the system provide information on the subjects of interest to the user, specifically tied to the final level of the menu. This, of course, denies the user information related, not only to the overall structure of the search, but also that global, overview and higher level information often of critical interest in seeing the "bigger picture" that puts the finer detail information within a context.

This is particularly true when dealing with educational software systems. It is now well accepted that computers offer a powerful tool for use in education of adolescents and adults. One of the major criticisms of the use of computers in formal education stems from their use as purely an "answer" machine—answers given without the attendant methods of more sophisticated exploration normally associated with information acquisition. For example, computer access to information on whales would involve simply entering the key word "whale" and then displaying a segment from memory on this subject. This segment may provide information on the whale, its habitats, and its relationship with other water borne mammals. However, the system's key word format fails to provide information to the user about where whales fit with the related data available in the information base. Generally, this format denies the user the details on the structure of information associated with a given topic, and thus fails to provide context and perspective to the chosen topics. This is a significant limitation as the understanding of information structure derived from global and/or more detailed views, and the knowledge of interrelationships between subjects is often more critical in education than the brute obtainment of facts.

Similar issues arise outside the field of computer assisted education and can be seen in other applications relating to business, entertainment, utilities and shopping. In each, existing menuing systems are, for the most part, designed for users who know where they want to go, and reaching this destination is the primary if not sole function of the menu. The use of the menu per se to give access to the underlying information at any and all levels of detail is simply ignored.

It is, therefore, recognized that, especially in the field of education, but also in many other fields, current menuing techniques starve the user regarding important information about broader views of the subject in the interest of reaching the final, most detailed display information. The present invention is directed to a solution to this problem.

OBJECTS AND SUMMARY OF THE PRESENT INVENTION

It is an object of the present invention to provide a data processing system that enhances the menuing interface for accessing information in the separate levels of the application being implemented.

It is yet another object of the present invention to provide a user menu system that is linked to a data display screen so that data associated with a given menu choice is currently displayed to the user at whatever level in the menu structure is selected by the user.

It is a further object of the present invention to provide an educational data processor having a multilayer access system where succeeding menus are retained on the display, so that the overall structure of the application remains visible to the user.

It is yet another object of the present invention to provide a data processor that iteratively accesses increasing levels of detail regarding a selected topic pursuant to user selected menu entries wherein the data displayed is based on user menu selection and corresponds to information having a degree of detail commensurate with the chosen level within the menu hierarchy.

It is another object of the present invention to provide an enhanced user interface for a data processing system wherein the hierarchial path to the final level in a multilayered application remains on the display providing historical data regarding the path to the current level of the application.

The above and other objects of the present invention are realized in a data processing interface integrated with a hierarchial menuing system that provides multilevel menu structure as a continuous aspect of the screen display. The screen display is subdivided into a first data display segment window for the presentation of content information relating to a selected menu category item, and a second menu display segment for the presentation of menu item and path information, tracing the path to the current display of content information.

An exemplary arrangement of the menu display segment involves a primary categorical display bar on a single subject, contiguous with a secondary display bar having a plurality of secondary items representing selections corresponding to the primary categorical display bar, but providing a greater level of detail within that subject. This secondary display bar is contiguous with a tertiary display bar, which is composed of tertiary items. These tertiary items relate to an item from the secondary bar that is selected by the user and provide even greater detail regarding the subject matter of the secondary item selected.

The system accesses presentation data in accordance with the selection of items within the menu structure. This information is then presented in the display segment of the screen. Importantly, the information accessed and presented reflects the level of detail of the item selected from the menu. For example, selecting an item from the primary bar will produce a broad or global presentation on that subject matter in the data display segment. As the user penetrates to lower menu bars, selected items will produce display information on that same subject area, but with increasing detail.

Navigation through the menu bars and their associated levels is further enhanced by an item coding regimen wherein secondary items are displayed with differing and distinct colors and/or patterns. Selection of a secondary item controls the content and appearance of the tertiary bar—all tertiary bar items will be related to the selected secondary item and will be presented in the tertiary bar having the same coding, e.g., the same color or pattern of the selected secondary item. If additional bars extend beyond the tertiary bar, these will follow this regimen using pattern or color coding to relate lower level items to the selected tertiary item. Patterns will include hash marks, dots, etc.

In accordance with the varying aspects of the present invention, the data display segment of the screen is further subdivided into two separate data windows. The first window is for graphics and image display and the second window is for display of text associated with the graphics display.

The foregoing features of the present invention may be more fully appreciated from the following detailed description of a specific illustrative example thereof, presented hereinbelow in conjunction with the accompanying drawing of which:

DETAILED DESCRIPTION OF THE PRESENT INVENTION

First briefly in overview, the present invention concerns the user interface in implementing a specific data processing application. The inventive interface is characterized by a unique menuing system that permits layered access to information via selection of a hierarchy of items described and represented by contiguous menu bars. The menuing system concurrently displays at least three levels of data access with each level of the menu supplying information to the user tied to a specific degree of detail contingent on the item and menu bar selected. The levels are dynamic and may be addressed at any time by the user to shift level and current data focus. Separately, the resulting data is shown on a split screen combining text and images on the subject matter pertaining to the user's selections.

In metaphorical terms, the inventive memory system operates like a microscope with three different magnification levels. The first magnification operates to provide a macro view of the subject. For example, if examining a bacteria cell, the first magnification would show the entire cell and its position in relation to other cells. Shifting to the second (higher) magnification brings into view the interior of the cell, depicting cell compounds such as the nucleus and mitochondria. And, finally, the third (highest) magnification provides even more detail on the interior of the nucleus, such as chromosomes. However, isolation to this final view denies the user of the microscope information about the cell in broader terms, e.g., cell wall, nucleus position, etc. Thus, the microscope is a more powerful tool when capable of viewing the subject at multiple levels that vary in scope. Similarly, information acquisition is of greater benefit when accessed using a menuing system providing multiple levels of data access varying in degrees of detail.

Figure 1:
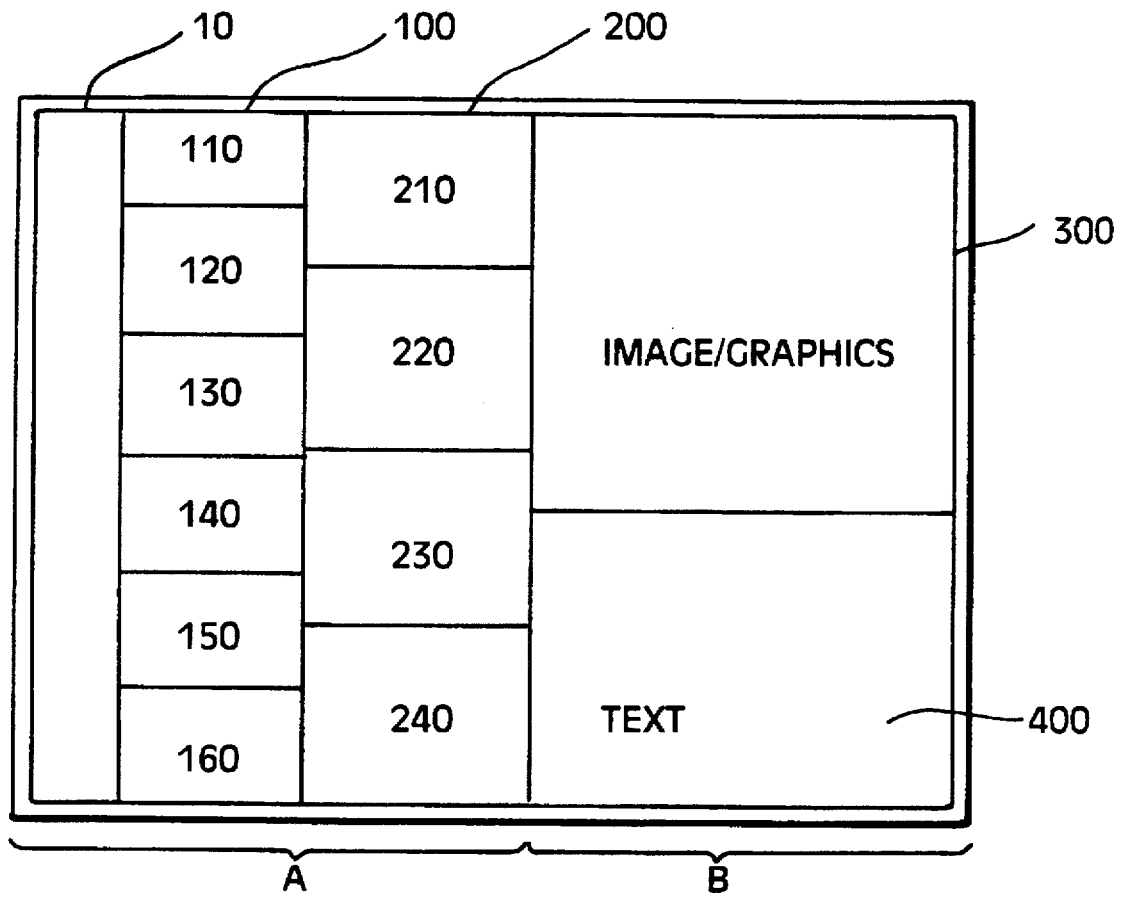
FIG. 1 is a diagram of a representative screen display for use in conjunction with the present invention.

With the above brief overview in mind, attention is now directed to FIG. 1 which presents a diagram of a typical display using the inventive system. More particularly, FIG. 1 depicts a two-dimensional representation of a computer output screen, conventional in a hardware sense and corresponding to any number of display systems on the market that vary in such parameters as dot pitch size, resolution, scanning rate, refresh rate, etc.

The screen of FIG. 1 is selectively divided into two major segments, indicated as segment A, the menu profile including menu bars 10, 100 and 200, and segment B, the data content display window. Dimensionally, the menu segment A will consume approximately 30% of the total screen area with the remaining 70% used for the data segment B.

Continuing with FIG. 1, the menu bars of the menu segment A represent succeeding levels of access and detail through the menuing system. More particularly, primary bar 10 is the highest current level and provides a global categorization of the data. For example, in an educational system on the presidents of the United States, primary bar 10 would be labeled "Presidents"—thus indicating throughout system use the general subject matter for this segment of the application.

In this context, user selection of the primary bar would trigger memory access of the data display file corresponding to the general subject matter of the primary bar 10. If this subject matter is titled "Presidents", the data display window would then provide a general presentation on this subject, e.g., an image of the White House connected to images of Congress and the Supreme Court and possibly some text on the origins of Presidential power from the theories of Locke and Hobbes.

Secondary Bar 100 is logically linked to Primary bar 10 as a sub-category thereof, providing the next level of detail about the primary bar 10 subject. Secondary Bar 100 is further divided into secondary items 110–160. In this fashion, each secondary item represents a logical information sub-category to the subject matter defined by primary bar 10 and provides a more detailed examination of this topic.

For example, if primary bar 10 is directed to Presidents, secondary bar 100 would be directed to specific Presidents and the secondary items 110–160 would be e.g., "Washington", "Jefferson", "Madison", "Monroe", etc., wherein each secondary item represents a sub-category within the broad subject defined by primary bar 10. Selection of any of these secondary items will access a data file containing graphical and textual information on that item's subject for display, and further define the menu items in the tertiary bar.

Following this pattern, the tertiary (TR) bar 200 represents an even more detailed level of information which is contingent on the selection of one of the items from the secondary bar. Expressed somewhat differently, the selection of an item in the secondary bar will define the subject categories available for the items of the next level, which are then placed in the tertiary bar 200—as each item in the secondary bar is logically concatenated to a series of additional items representing deeper, more probing presentations available in the tertiary level. The selected secondary bar item's color or pattern will be carried forward to correspond to the concatenated tertiary items, thereby indicating to the user the connection between the subject matter of the two levels.

For example, if "Jefferson" is selected from the items in the secondary bar, the system processor will access the general file from memory on Jefferson, which is then conveyed to the data display segment B. This general presentation on Jefferson might include biographical text with pictures which may be leisurely reviewed by the user. In addition, system processor pulls from memory selected items associated with Jefferson and displays these as tertiary items in tertiary bar 200 as e.g., "Monticello", "Supreme Court Selections", "Louisiana Purchase", etc. These tertiary items are color coded to correspond to the same color as the Jefferson secondary item and differentiated from the other secondary items such as Washington and Monroe which have different colors.

Continuing with this process, if the user selects an item from the tertiary bar, e.g., "Monticello", the system uses this selection to access a data file on the subject Monticello. The general data on Jefferson is then removed from the data display by the processor and replaced with the more detailed information on Monticello in the data display segment B.

The menu items displayed in tertiary bar 200 contain only items related to one of the items in the secondary bar 100, in this case Jefferson. In addition, the items in tertiary bar 200 contain the same color or pattern, and match the color or pattern of the item selected in secondary bar 100.

Importantly, when the final data file is accessed for display in the data segment B, all of the menus used to access this data are shown in full in the menu segment A, i.e., Bars 10, 100 and 200 remain on the screen giving the user a detailed presentation not only of the final data, but on the path and method required to access this data. The user may retreat to higher levels of information by merely selecting items in the higher level menu bars. This gives the user a much fuller appreciation of select information, as this information is set within a framework of the general subject area. It also enhances data accessing skills as the user reasons through the matrix of levels to obtain the desired result.

Referring to the data segment B of FIG. 1, this window is further divided into text and image/graphic/video portions, wherein the data accessed for display includes both images and graphics combined with text for a more complete and thorough presentation. Continuing with the example discussed above, the "Monticello" group of the third level accesses from system memory data on Monticello—which may include text data—with multiple pages accessed individually or through per se page scrolling techniques available in the text partition of the data display segment. The Monticello file may also include pictures of the famous estate, a short video (with accompanying audio) charts and graphs, etc.—each displayable in the image/graphics partition of the data segment B. The menu, occupying approximately 30% of the screen, may be "minimalized" at any time allowing the data portion of the screen to expand and fill the entire screen. The continued existence of the menu portion may be represented by a small pictorial "icon" in the expanded data display. Selecting this icon, via a mouse click, will regenerate the menu portion of the display to its full and original form.

Figure 2:
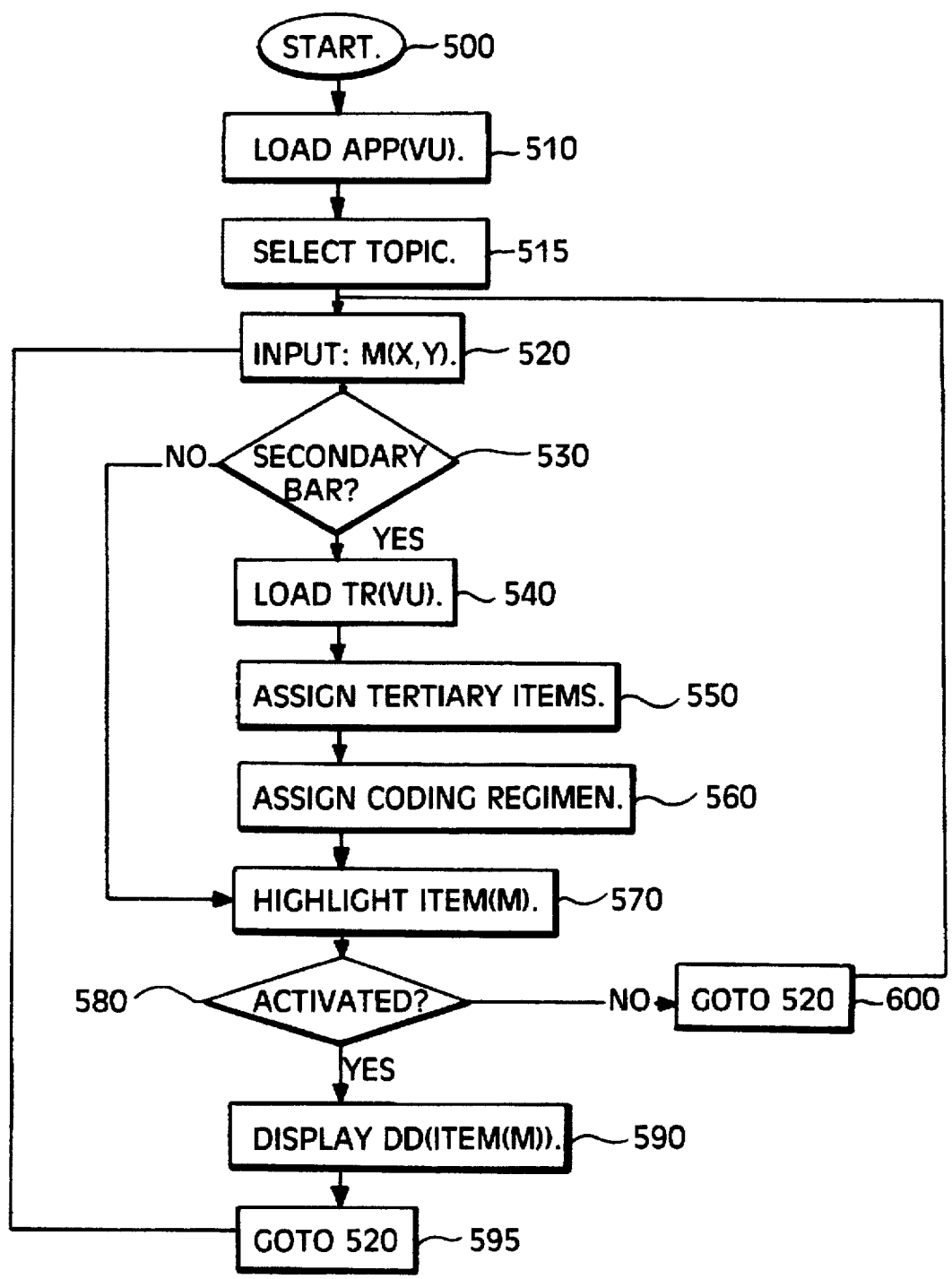
FIG. 2 is a logic flow chart for controlling system logic that defines menu attributes.

Turning now to FIG. 2, a logic flow chart is presented delineating system operation. Logic conceptually begins at Start block 500, and continues to block 510 wherein the display controlling application APP(VU) specific to a selected topic of interest is loaded into system memory. At block 515, the user enters a general subject area which defines the data base accessed by the processor via menu commands as translated by the user. Pursuant to this entry, the system generates the primary and secondary bar structures for display and provides the plurality of secondary items linked to the selected primary bar subject. The tertiary bar and the data display windows default initially to blank screens and remain blank until the activation of an item in the primary and/or secondary bar. This completes the initial screen display.

Once activated, the system orchestrates the menu bar displays in accordance with the position of the mouse pointing device. This is initiated at block 520, wherein the position of the mouse on the screen is ascertained in matrix terms, M(X,Y).

Once the mouse position is entered, test 530 thereafter determines whether the mouse is located in the secondary bar; if so, logic proceeds to block 540 where the corresponding tertiary items are accessed pursuant to the above mouse position X,Y coordinates. The system then selectively divides the tertiary bar into the individual tertiary items— each with a title relating to its more detailed subject area of interest, block 550. Logic then proceeds to block 560 wherein the system assigns visual enhancements, e.g., color or pattern attributes, to the tertiary items culled from memory to correspond to the selected secondary item color or pattern.

At block 570, the mouse position is identified within the border of an item matrix in a bar and the system then tests whether a command has been separately entered by the user at that position. In this context, a command refers to a user request to access a data file associated with the item at the activated mouse position for display in the data window. This selection is made by activating the mouse button, test 580. If activated, logic proceeds to block 590 and the visual and text data linked to the selected item is sent to the display. Logic loops back to block 520 to ascertain changes in mouse location in (X, Y) and new item actuation. Operation continues through selective iterations as presented by the user.

EXAMPLE

The foregoing features of the invention are presented in a system directed to an educational program (application). In this example, the user is given an initial screen menu representing a variety of topics. Exemplary topics, for purposes of this example, include "U.S. Presidents" and "Chemistry Principles".

Figure 4:
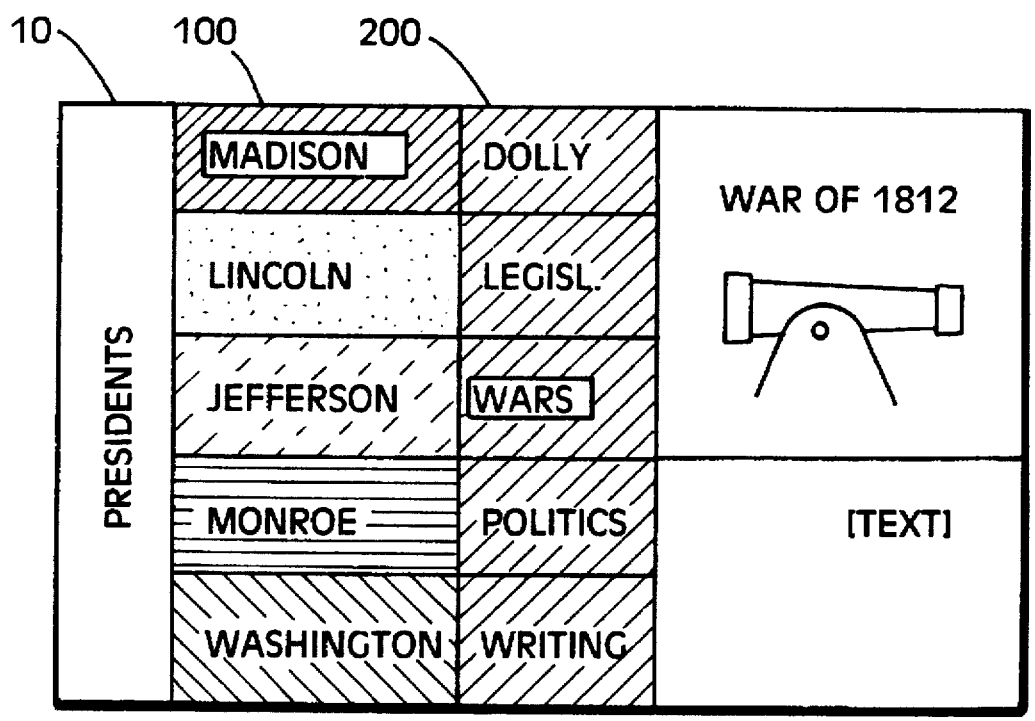
FIG. 4 is a representative screen display corresponding to the system of the present invention.

User selection of Presidents drives system logic to display the initial screen in accordance with the present invention (FIG. 4). In particular, three bar menus are displayed on the right third of the screen as follows: The primary bar will be assigned the general topic "Presidents", bar 10 in FIG. 1. The system accesses the secondary items associated with "Presidents" e.g., the five items on Washington, Jefferson, Madison, Monroe, Lincoln, and assigns these items to the secondary bar 100. At this time, the user may access data for display on either the general category of Presidents, or any of the secondary items by selection, via mouse.

Although the items of the tertiary bar are originally blank, user selection of Madison in the secondary bar will trigger memory access of the tertiary items associated with Madison for display. The system subdivides the tertiary bar into rectangles equalling the number of tertiary items associated with Madison and then assigns these items to the tertiary bar 200, i.e., the five tertiary items pertaining to Madison—Dolly, Legislation, Wars, Politics and Writings.

The data display takes up the remaining two-thirds of the screen. At this point, the user may optionally select entries relating to Madison from the tertiary bar 200. If "Wars" is chosen, data is presented on the data screen relating to the significant conflicts of Madison's administration, including pictures, maps, etc., with connecting text, video and voice/music audio output (if on a multi-media system).

If the user moves the cursor to the second level item "Jefferson", the five groups relating to Madison are removed from the third level and replaced with topics on Jefferson, such as "Monticello", etc.

Figure 3:
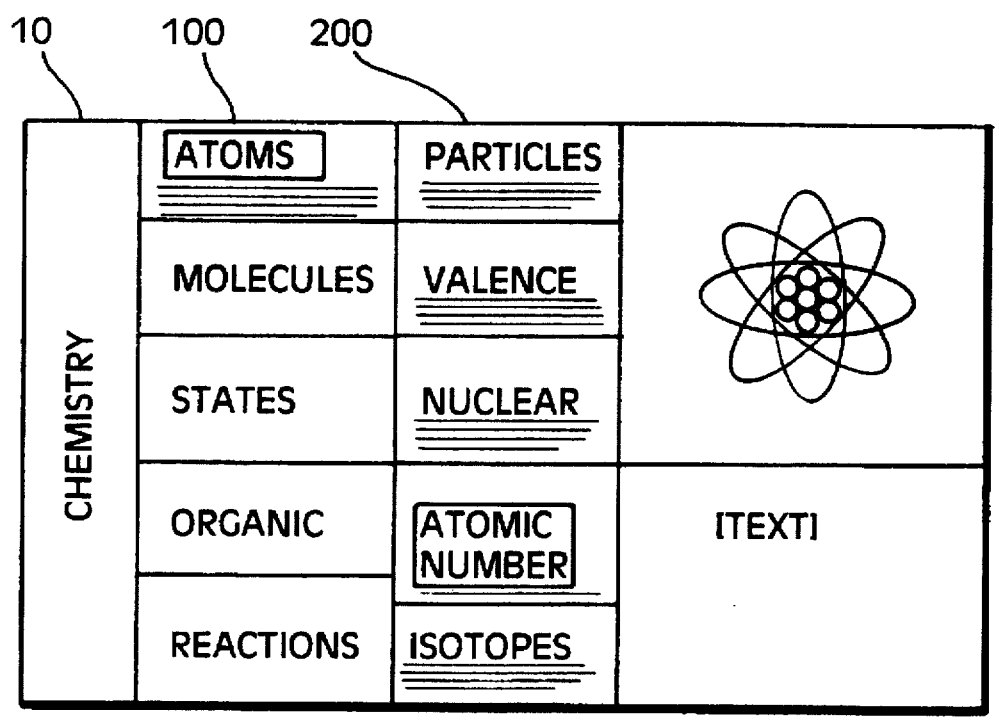
FIG. 3 is a representative screen display corresponding to the system of the present invention.

The user may exit from Presidents and choose "Chemistry Principles", wherein a separate but similarly structured menu system is displayed (FIG. 3). In this display, bar 10 is "Chemistry". Bar 100 includes items Atoms, Molecules, States, Organic Compounds and Reactions. Upon selection of "Atoms", tertiary bar 200 provides select items about Particles, Valence Numbers, Nuclear Structure, Atomic Number and Isotopes. Simultaneously, the data display will present a general overview on the subject "Atoms". Again, a selection from the tertiary bar accesses for display a presentation on the topic selected. If Nuclear Structure is selected, the data display will include graphics and text on the Bohr Atom, including electron orbits, etc. Moreover, the user may retreat to high level topics, such as "States" with the system displaying general information on chemical states, while concurrently removing and replacing the tertiary items with a new group relating to this subject.

As can be appreciated, the display menus remain on screen providing lineage on the subject categories and information on the path taken to the current display. This provides a richer information environment and enhances interaction with the system. Students simply cannot resist investigating ancillary topics given the ease of access.

It should be noted that the above descriptions are presented to illustrate the invention and that modifications by those skilled in the art are possible without departing from the spirit and scope of the invention.

What is claimed is:

1. A data processing system for hierarchical access to a multilevel application comprising:
    display screen controller for selective and programmed control of a two-dimensional screen display;
    pointing input device for entering input events by the user, controlling a displayed cursor, and comprising a button;
    a single display means for subdividing the display screen into a single simultaneous presentation composing a primary menu bar, a secondary menu bar, a tertiary menu bar, a graphics window, and a text window, wherein the primary menu bar contains a single menu item and the secondary and tertiary menu bars contain a plurality of menu items containing a label and selectable by the displayed cursor, wherein each menu bar is subdivided between the menu items, wherein primary menu bar provides a single subject menu item, wherein the secondary menu bar provides menu items corresponding to the primary categorical item with increasing level of detail, wherein the tertiary menu bar provides menu items corresponding to the secondary display bar with increasing level of detail in response to selecting a secondary menu item;
    default screen display means for initially displaying blank data in graphics window, text window, and the tertiary bar until selection of a menu item;
    secondary menu item display coding regimen means for displaying differing and distinct colors and patterns in the secondary menu items;
    secondary bar position determination means for determining the cursor located over a secondary menu item;
    tertiary menu bar accessing means for accessing tertiary menu items in response to the cursor located over a secondary menu bar item;
    tertiary menu item display coding regimen means for displaying the distinct color and pattern in the tertiary menu items corresponding to the selected secondary menu item;
    highlighting means for highlighting the tertiary menu item in response to a cursor located over a tertiary menu item;
    activation means for activating the button on the cursor input device after highlighting a menu item;
    memory for storing data files containing data for display in the graphics window and text window;
    graphics window for displaying graphics, image and video data corresponding to an arbitrarily selected menu item in one of the bars and corresponding to the level of detail of the menu item;
    text window for displaying text corresponding to an arbitrarily selected menu item in one of bars and corresponding to the level of detail of the selected menu item, wherein multiple pages may be scrolled; and
    tertiary menu bar replacement means for replacing the tertiary menu items in response to retreating to the secondary menu bar and selecting a different secondary menu bar item.

2. The system in claim 1 including an audio output means for producing voice or music audio output.

* * * * *